(12) United States Patent
Van Thiel (10) Patent No.: US 11,440,521 B2
(45) Date of Patent: Sep. 13, 2022

(54) ELECTROPNEUMATIC BRAKE CONTROL MODULE FOR UTILITY VEHICLES WITH REDUNDANCY PRESSURE CONNECTOR

(71) Applicant: WABCO GmbH, Hannover (DE)

(72) Inventor: Julian Van Thiel, Großburgwedel (DE)

(73) Assignee: WABCO GmbH, Hannover (DE)

( * ) Notice: Subject to any disclaimer, the term of this patent is extended or adjusted under 35 U.S.C. 154(b) by 66 days.

(21) Appl. No.: 17/040,573

(22) PCT Filed: Mar. 25, 2019

(86) PCT No.: PCT/EP2019/057359
§ 371 (c)(1),
(2) Date: Sep. 23, 2020

(87) PCT Pub. No.: WO2019/192863
PCT Pub. Date: Oct. 10, 2019

(65) Prior Publication Data
US 2021/0070272 A1    Mar. 11, 2021

(30) Foreign Application Priority Data

Apr. 5, 2018   (DE) ...................... 10 2018 108 091.3

(51) Int. Cl.
*B60T 13/68* (2006.01)
*B60T 13/26* (2006.01)
(Continued)

(52) U.S. Cl.
CPC .......... *B60T 13/683* (2013.01); *B60T 13/266* (2013.01); *B60T 15/027* (2013.01); *B60T 15/043* (2013.01);
(Continued)

(58) Field of Classification Search
CPC ...... B60T 13/26; B60T 13/261; B60T 13/263; B60T 13/265; B60T 13/268; B60T 13/36; B60T 13/683; B60T 17/221
(Continued)

(56) References Cited

U.S. PATENT DOCUMENTS 6,467,854 B2 * 10/2002 Frank ...................... B60T 8/323
137/596.17
7,905,557 B2 * 3/2011 Frank .................... B60T 15/027
303/118.1
(Continued)

FOREIGN PATENT DOCUMENTS

DE           4031551 C1    1/1992
DE          10245916 A1    4/2004
(Continued)

OTHER PUBLICATIONS

European Patent Office, Rijswijk, Netherlands, International Search Report of International Application No. PCT/EP2019/057359, dated May 14, 2019, 2 pages.

*Primary Examiner* — Thomas J Williams
(74) *Attorney, Agent, or Firm* — Dickinson Wright PLLC (57) ABSTRACT

An electropneumatic brake control module (1) for utility vehicles (100) includes a supply port (2) for connecting a compressed air supply (3); a first axle channel port (4); a pneumatically controlled inlet/outlet valve unit (10) for outputting a first braking pressure (PB1) at the first axle channel port (4); and an electropneumatic pilot control unit (8) for outputting at least one first control pressure (P1) at the inlet/outlet valve unit (10). The brake control module (1) further includes a redundancy pressure port (6) for receiving a redundancy pressure (PR) and a redundancy valve unit (12) connected to the redundancy pressure port (6) for outputting a redundancy braking pressure (PBR) at the first
(Continued)

axle channel port (4) in the event that the electropneumatic pilot control unit (8) has a fault.

21 Claims, 4 Drawing Sheets

(51) Int. Cl.
*B60T 15/02* (2006.01)
*B60T 15/04* (2006.01)
*G05D 15/01* (2006.01)

(52) U.S. Cl.
CPC ........ *G05D 15/01* (2013.01); *B60T 2270/402* (2013.01); *B60T 2270/413* (2013.01)

(58) Field of Classification Search
USPC ........ 303/3, 13, 15, 20, 122, 122.09, 122.15
See application file for complete search history.

(56) References Cited

U.S. PATENT DOCUMENTS

| | | | |
|---|---|---|---|
| 9,327,694 B2 * | 5/2016 | Klostermann | B60T 11/108 |
| 10,933,856 B2 * | 3/2021 | Didwiszus | B60T 13/662 |
| 2017/0210365 A1 * | 7/2017 | Lulfing | B60T 8/327 |
| 2020/0276962 A1 * | 9/2020 | Herges | B60T 17/22 |
| 2021/0001828 A1 * | 1/2021 | Van Thiel | B60T 8/94 |

FOREIGN PATENT DOCUMENTS

| | | | | |
|---|---|---|---|---|
| DE | 102004010743 A1 * | 1/2006 | | B60T 17/083 |
| DE | 102006041011 A1 | 3/2008 | | |
| DE | 102014006614 A1 | 11/2015 | | |
| DE | 102015110386 A1 | 12/2016 | | |
| DE | 102018108092 A1 * | 10/2019 | | B60T 13/662 |
| EP | 0547407 A1 | 6/1993 | | |
| EP | 1780087 A1 | 5/2007 | | |
| WO | 0166397 A1 | 9/2001 | | |

* cited by examiner

ELECTROPNEUMATIC BRAKE CONTROL MODULE FOR UTILITY VEHICLES WITH REDUNDANCY PRESSURE CONNECTOR

TECHNICAL FIELD

The invention relates to an electropneumatic brake control module for utility vehicles with a supply port for connecting a compressed air supply, a first axle channel port, a pneumatically controlled inlet/outlet valve unit for outputting a first braking pressure at the first axle channel port, and an electropneumatic pilot control unit for outputting at least a first control pressure at the inlet/outlet valve unit. The invention further relates to a vehicle with such an electropneumatic brake control module.

BACKGROUND

Electropneumatic brake control modules of the type mentioned above are used in pneumatic brake systems for motor vehicles, in particular utility vehicles. Pneumatic brake systems for motor vehicles usually have a pneumatically actuated brake per wheel of the motor vehicle, wherein the pneumatic operating medium, in particular compressed air, is provided for the wheel brakes in a supply pressure accumulator under static pressure. The brake systems have a brake signal transmitter which is coupled to the movement of a brake pedal actuated by the driver of the motor vehicle and which generates a braking demand signal on actuating the brake pedal. Depending on the braking demand signal, a target braking pressure is set at the wheel brakes. In modern vehicles, the brake signal transmitter can also operate purely electronically, so that a braking demand signal is output, in particular by a central control module or the like.

The electropneumatic brake control module of the present invention is used in particular to receive a braking demand signal and then to output a corresponding first braking pressure at the first axle channel port. The first axle channel port is provided for a front axle, for example. On the front axle, the controlled first braking pressure can then be output for both the left and right brakes or can be further output. The electropneumatic brake control module of the present invention is therefore also referred to as an axle modulator, since it is used to output a (global) braking demand signal for one of the front and rear axles or multiple axles, separately and preferably output.

An electropneumatic brake control module of the above type is known to the present applicant from DE 10 2014 006 614 A1. Disclosed therein is a pneumatic brake device for motor vehicles, containing a brake signal transmitter, a supply pressure accumulator and a pneumatically actuatable wheel brake per wheel as well as at least one axle of the motor vehicle, each with an electrically actuatable wheel brake module per wheel for setting a target braking pressure at the respective wheel brake, as well as with an electronic control unit for determining the setpoint values of the target braking pressures of the wheel brakes, taking into account the brake signal transmitter, which can be specified for the wheel brake modules. Each wheel brake module includes: at least one ventilation valve and one venting valve, electrically actuatable activating means for activating the ventilation valve and/or the venting valve, a control logic with means for generating an actuation signal for the activating means according to the specified value for the target braking pressure. In this case, the ventilation valve and its activating means are designed in such a way that the pneumatic pressure from the supply pressure accumulator is fed through directly to the respective wheel brakes with the ventilation valve in the actuated state and/or the venting valve vents the braking pressure on the wheel brake directly into the atmosphere when in the actuated state. This means that the wheel brake module comprises a respective pneumatically actuated 2/2-way valve as a ventilation valve and a venting valve. There is no relay valve there which is switched between a supply port and the corresponding connection for the wheel brake. The electrically actuated activation means are designed as an electropneumatic pilot control unit, which outputs a corresponding control pressure for the 2/2-way valves that form the ventilation valve and the venting valve.

Even if such a wheel brake module works well, there is still a need to improve it, in particular to increase the safety of the vehicle, to reduce the installation space of the modules and to produce inexpensive and cost-effective modules, which do not need expensive and complex relay valves in particular.

SUMMARY

In a first aspect of the invention, the electropneumatic brake control module has a redundancy pressure port for receiving a redundancy pressure and a redundancy valve unit connected to the redundancy pressure port for outputting a redundancy braking pressure at the first axle channel port for the case in which the electropneumatic pilot control unit has a fault.

The redundancy pressure is preferably provided by a brake pedal. This means that in the event of a fault, a driver of the vehicle can generate a manually controlled redundancy pressure by operating the brake pedal, which is then provided at the redundancy pressure port. According to the invention, this redundancy pressure is then used to replace the first braking pressure in that a redundant braking pressure is output at the first axle channel port.

In this case, the defect of the electropneumatic input control unit is in particular the failure of one or more valves of the electropneumatic control unit, the failure of an electronic control unit providing control signals for the electropneumatic pilot control unit, the failure of a central control module or the like. All these cases have in common that an electronic braking demand signal cannot be generated, processed, or processed properly. In this case, the first braking pressure is replaced by the redundant braking pressure.

In this way, the reliability of the electropneumatic brake control module can be improved. Even in the event that an electronic component does not work or does not work properly, it is nevertheless possible to brake a vehicle safely in that the redundancy pressure controlled in particular by means of the brake pedal is processed in order to output the redundant braking pressure.

In a preferred embodiment, it is provided that the first braking pressure can be fed through the inlet/outlet valve unit from the supply port to the first axle channel port directly and unboosted, i.e. without increasing the air volume or the air pressure, by means of an in particular pneumatic relay valve. The inlet/outlet valve unit preferably has no relay valve. This can reduce the installation space and can make the module more cost-effective overall to manufacture.

In a particularly preferred embodiment, the redundancy valve is connected to the inlet/outlet valve unit in such a way that the redundant braking pressure can be output at the first axle channel port via a first outlet line for venting the first axle channel port in the event of a pilot control unit fault.

This allows on the one hand the use of fewer pneumatic lines, since the already existing first outlet line is necessary for venting the first axle channel port. In the event of a fault, it is also advantageous if the inlet/outlet valve unit is switched so that the first axle channel port is or will be vented, i.e. is not or will not be ventilated. The first outlet line, which is then open in this fault case, is advantageously used according to this embodiment to introduce the redundant braking pressure in order to output the redundant braking pressure at the first axle channel port.

Furthermore, it is preferred that the inlet/outlet valve unit has a first pneumatically switchable 2/2-way inlet valve and a first pneumatically switchable 2/2-way outlet valve, wherein the first pneumatically switchable 2/2-way inlet valve receives the first control pressure and the first pneumatically switchable 2/2-way outlet valve receives a second control pressure from the pilot control unit. In this embodiment, the pilot control unit provides both the first control pressure and the second control pressure. The first control pressure is used to switch the first 2/2-way inlet valve and the second control pressure is used to switch the first 2/2-way outlet valve. Preferably, the first 2/2-way inlet valve is closed without pressure and the first 2/2-way outlet valve is open without pressure. This means that as soon as the first control pressure exceeds a certain threshold value, the first 2/2-way inlet valve switches to the respective other working position. Similarly, as soon as the second control pressure exceeds a certain threshold value, the first 2/2-way outlet valve switches to the respective other switching position. In this way, a relay valve can be omitted.

In a preferred development, the first pneumatically switchable 2/2-way inlet valve has a first inlet valve port connected to the supply port, a second inlet valve port connected to the first axle channel port and a first inlet valve control port for receiving the first control pressure. Similarly, the first pneumatically switchable 2/2-way outlet valve preferably has a first outlet valve port connected or connectable to a vent, a second outlet valve port connected to the first axle channel port and a first outlet valve control port for receiving the second control pressure. The term "connectable" means in this context that one or more further valves may be connected between the first outlet valve port and the vent, so that when all these valves are open or the connections of the corresponding valve ports are connected through, the first outlet valve port is pressure-conductively connected to the vent. In other words, the first axle channel port can be vented via the first outlet valve port.

Furthermore, it is preferred that the redundancy valve unit has a redundancy valve. The redundancy valve preferably has a first redundancy valve port connected to the redundancy pressure port, a second redundancy valve port connected to first axle channel port and a third redundancy valve port connected to a vent. Also in this context, the term "connectable" means that one or more further valves may be connected between the second redundancy valve port and the first axle channel port, so that when all these valves are open or the connections of the corresponding values are switched through, the second redundancy valve port is pressure-conductively connected to the first axle channel port. The redundancy valve is preferably designed as a 3/2-way valve and switched so that in a first deenergized switching position the first redundancy valve port is connected to the second redundancy valve port and in a second, energized switching position the third redundancy valve port is connected to the second redundancy valve port. In this way, in a deenergized switching position, the redundancy pressure can be fed through from the first redundancy valve port through the redundancy valve and can be provided at the second redundancy valve port, whereas in an energized state of the redundancy valve the redundancy pressure is blocked. In the event of a fault, the redundancy valve is then switched to the deenergized state or has already been switched off by the fault, so that the redundancy pressure can be fed through. In this case, the second redundancy valve port can be connected to the first axle channel port, so that in this case the redundancy pressure can be output at the first axle channel port either boosted or not boosted as the redundant braking pressure.

In a preferred development, it is provided that the redundancy valve unit has a shuttle valve and the redundant braking pressure can be introduced into the first outlet line via the shuttle valve. This prevents pressure from being or being able to be fed back to the redundancy port during venting of the first axle channel port. Furthermore, in this way, the redundancy pressure can be easily introduced into the first outlet line and yet at the same time this can be used for venting the first axle channel port, even if the first axle connection is to be vented again to release the wheel brakes in the redundant braking case.

In addition or alternatively, it may be provided that the redundancy valve has a relay valve for boosting the air volume or air amount of the redundancy pressure. Depending on the formation of the redundancy pressure and the type of provision, it may be necessary to boost the volume or the air volume by means of a relay valve in order to be able to provide it at the wheel brakes. If, for example, the first axle channel port is used to first provide a pressure to another module, it may be sufficient that the pressure is volume boosted there in this further module and passed to the wheel brakes. In this variant, however, the electropneumatic brake control module itself has a relay valve for the redundancy pressure. In this case, such a relay valve can be simple and small, as it does not have to be designed for continuous operation. The relay valve is used solely to boost the redundancy pressure or the air amount and/or the air volume of the redundancy pressure, which is used exclusively in the event of a fault. Therefore, it is nevertheless possible to design the electropneumatic brake control module to be installation space saving and cost saving, even though it has a relay valve in this embodiment.

Preferably, the relay valve has a relay valve supply port connected to the supply port, a relay valve venting connection connected to a vent, a relay valve working port for outputting the redundant braking pressure into the first outlet line and a relay valve control port connected or connectable to the redundancy pressure port. As a control pressure, the relay valve thus receives the redundancy pressure output at the redundancy pressure port, which can, for example, correspond to a manually generated pressure from a brake pedal. If this pressure is not present or is blocked, the relay valve is therefore in a venting position, since no control pressure or a control pressure with the value of the ambient pressure is applied; the relay valve working port is vented in this position. This means that the relay valve can also be used for venting the first outlet line and thus for venting the first axle channel port. In the event that a redundancy pressure is applied to the relay valve control port as a control pressure, a pressure is output via the relay valve working port, which can then be output via the first outlet line to the first axle channel port as a redundant braking pressure. In this way, a particularly simple circuit is achieved, which manages with an optimized air flow between the individual connections.

In a variant of this circuit it is preferred that the relay valve working port is connected to the first outlet valve port. Preferably, the relay valve working port is directly connected to the first outlet valve port, for example via a pneumatic line. This means that in this embodiment the first axle channel port can be ventilated via the first venting line, the first 2/2-way outlet valve and the relay valve. In the event of a fault, the first axle channel port can be vented via the relay valve, the first 2/2-way outlet valve, the first outlet line and a corresponding redundant braking pressure can be output.

In this circuit it is further preferred that the relay valve control port is connected to the second redundancy valve port. Preferably, in turn a pneumatic line, in particular a pneumatic control line, is provided between these. If the redundancy valve is then in the deenergized first switching position, the redundancy pressure can be output directly via this to the relay valve control port in order to output the redundant braking pressure at the first axle channel port.

Furthermore, in one variant it is provided that the shuttle valve has a first shuttle valve port connected or connectable to the redundancy pressure port, a second shuttle valve port connected to a vent and a third shuttle valve port connected or connectable to the first outlet line and alternately connects the third shuttle valve port to either the first shuttle valve port or the second shuttle valve port. The shuttle valve is preferably designed as a quick release valve, so that the third shuttle valve port is preferably connected to the second shuttle valve port and is only connected to the first shuttle valve port in the event of a pressure difference between the first shuttle valve port and the third shuttle valve port. The second shuttle valve port is connected to the vent, so that the ambient pressure is permanently applied to it. This means that the second shuttle valve port is only closed if a pressure is applied to the first shuttle valve port, such as in particular the redundancy pressure. Otherwise, the second shuttle valve port is permanently connected to the third shuttle valve port, so that the third shuttle valve port can be vented via the second shuttle valve port.

In a first variant, the first shuttle valve port is connected to the second redundancy valve port. The redundancy pressure is directly output at the first shuttle valve port. This can then be fed through when applied to the third shuttle valve port.

In one variant, the first shuttle valve port is connected to the relay valve working port. This means that the pressure output from the relay valve working port is then passed via the shuttle valve, i.e. is output via the first shuttle valve port and then to the third shuttle valve port. The second shuttle valve port is preferably directly connected to a vent in this variant. In this variant, it is then not necessary to also use the relay valve for venting the first axle channel port, this can rather be vented directly via the third shuttle valve port and the second shuttle valve port. Thus a direct venting path is created.

In a further preferred embodiment, the electropneumatic brake control module is provided for the purpose of outputting braking pressures for two axles and accordingly has a second axle channel port. The inlet/outlet valve unit is then designed to output a second braking pressure at the second axle channel port. The first axle channel port can be provided, for example, for the front axle and the second axle channel port for the rear axle. It could also be provided that the first axle channel port is provided for a left wheel and the second axle channel port for a right wheel.

Furthermore, in this embodiment is provided that the electropneumatic pilot control unit is designed to provide at least a third control pressure at the inlet/outlet valve unit, and the redundancy valve unit is designed to output the redundant braking pressure at the second axle channel port for the case in which the electropneumatic pilot control unit has a fault. This means that in the event of a fault, the redundancy pressure is not only output at the first axle channel port as a redundant braking pressure, but also at the second axle channel port as a redundant braking pressure. In this case of a fault, therefore, the same braking pressure is output at both axle channel ports, both the first and the second axle channel ports. It may also be provided that this redundant braking pressure is further output if the input unit has not completely failed, but only partially failed, for example by using additional valves and/or select-low valves.

In this exemplary embodiment, it is preferably further provided that the redundancy valve unit is connected to the inlet/outlet valve unit in such a way that the redundant braking pressure can be output at the second axle channel port via a second outlet line for venting the second axle channel port in the event of a fault of the pilot control unit. This principle is implemented correspondingly to the first axle channel port, and both the first axle channel port and the second axle channel port can be ventilated via their respective first or second outlet lines in the event of a fault in order to output the redundant braking pressure.

For this purpose, the inlet/outlet valve unit preferably has a second pneumatically switchable 2/2-way inlet valve and a second pneumatically switchable 2/2-way outlet valve for the second axle channel port, wherein the second pneumatically switchable 2/2-way inlet valve receives the third control pressure and the second pneumatically switchable 2/2-way outlet valve receives a fourth control pressure from the pilot control unit. Preferably, the second 2/2-way inlet valve is closed without pressure and the second 2/2-way outlet valve is open without pressure. Basically, the second two-way 2/2-way inlet valve may be designed according to the first 2/2-way inlet valve and the second 2/2-way outlet valve according to the first 2/2-way outlet valve.

In this sense, it is preferred that the second pneumatically switchable 2/2-way inlet valve has a third outlet valve port connected to the supply port, a fourth inlet valve port connected to the second axle channel port and a second inlet valve control port for receiving the third control pressure. Preferably, the second pneumatically switchable 2/2-way outlet valve accordingly has a third outlet valve port connected or connectable to a vent and a fourth outlet valve port connected to the second axle channel port and a second outlet valve control port for receiving the fourth control pressure.

Preferably, the second redundancy valve port can also be connected to the second axle channel port. The second redundancy valve port, via which the redundancy pressure can be forwarded, can therefore preferably be connected in this embodiment both to the first axle channel port and to the second axle channel port, in order to output the redundant braking pressure at both the first axle channel port and the second axle channel port.

In a corresponding manner, it is also preferred that if the redundancy valve unit has a shuttle valve, the redundant braking pressure can be introduced into the second outlet line via the shuttle valve.

In the event that the redundancy valve unit has a relay valve, it is also preferred that the redundant braking pressure can be introduced not only into the first outlet line, but also into the second outlet line via the relay valve working port. In particular and preferably, the relay valve working port is connected to the third outlet valve port. The relay valve working port is thus connected to both the first outlet valve port and the third outlet valve port, which can be realized by means of a branch line.

Embodiments of the invention are now described below on the basis of the drawings. These are not necessarily intended to represent the embodiments to scale, but rather the drawings are executed in a schematized and/or slightly distorted form, where this is conducive to explanation. With regard to additions to the teachings directly recognizable from the drawings, reference is made to the relevant prior art. It must be taken into account that various modifications and changes regarding the form and detail of an embodiment can be made without deviating from the general idea of the invention. The features of the invention disclosed in the description, drawings and claims may be essential for the further development of the invention, both individually and in any combination. In addition, all combinations of at least two of the features disclosed in the description, drawings and/or claims fall within the scope of the invention. The general idea of the invention is not limited to the exact form or detail of the preferred embodiments shown and described below or limited to a subject-matter which would be limited in comparison to the subject-matter claimed in the claims. In the case of specified design ranges, values within the specified limits shall also be disclosed as limit values and shall be usable and claimable as desired. For simplicity, identical or similar reference characters are used below for identical or similar parts or parts with identical or similar functions.

Further advantages, features and details of the invention arise from the following description of the preferred embodiments as well as on the basis of the drawings.

DETAILED DESCRIPTION OF THE DRAWINGS

An electropneumatic brake control module 1 according to the present invention has a supply port 2 and a first axle channel port 4. A compressed air supply 3 can be connected to the supply port 2, so that a supply pressure PV is provided. A first braking pressure PB1 which is output at the first axle channel port 4 can then be output directly or further modulated to one, two or more wheel brakes of a first axle. In the present example (FIG. 1), the first braking pressure PB1 is output via the first axle channel port 4 to the front axle. As a whole, the electropneumatic brake control module 1 is designed as a so-called axle modulator and is used to receive a braking demand signal SB, which is in particular electronically picked up from a brake signal transmitter or is output by a central unit, for example a unit for autonomous driving or the like. This braking demand signal SB is processed by the electropneumatic brake control module 1 and in a corresponding manner the first braking pressure PB1 is output at the first axle channel port 4.

Figure 1:
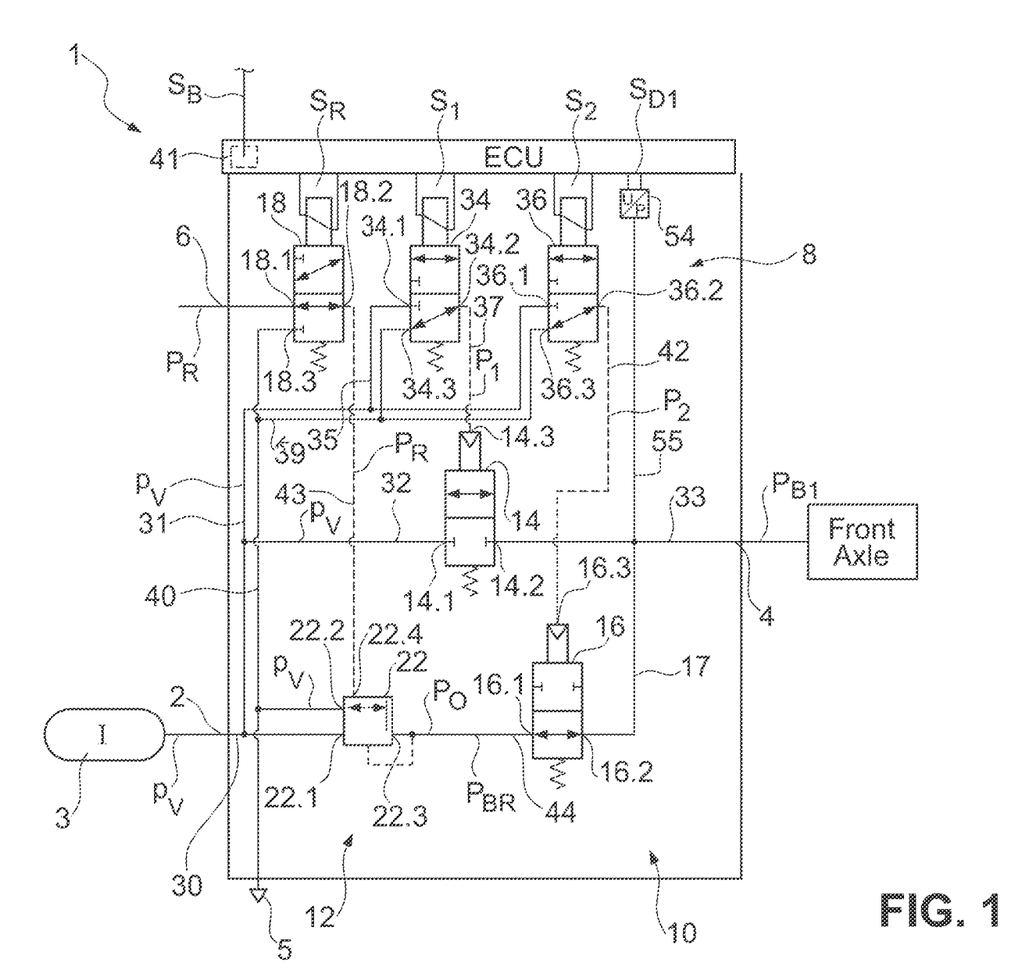
FIG. 1 shows an electropneumatic brake control module in a first exemplary embodiment with an axle channel port.

In addition to the first axle channel port 4, the electropneumatic brake control module 1 also has a redundancy pressure port 6, at which a redundancy pressure PR can be output. The redundancy pressure PR is generated in particular manually by means of a brake pedal, so that even in a deenergized state, for example if a central module fails, a braking demand signal can then be output in the form of a redundancy pressure PR to the electropneumatic brake control module 1.

For processing the input signals, such as the braking demand signal SB and the redundancy pressure PR, the electropneumatic brake system module 1 has an electropneumatic pilot control unit 8 as well as a pneumatically controlled inlet/outlet valve unit 10. For processing the redundancy pressure PR, the electropneumatic brake control module 1 also has a redundancy valve unit 12. By means of this redundancy valve unit 12 and based on the redundancy pressure PR at the first axle channel port 4, a redundant braking pressure PBR can be output, which replaces the first braking pressure PB1 in the event of a fault. The electropneumatic pilot control unit 8 provides both a first control pressure P1 and a second control pressure P2.

More specifically, the inlet/outlet valve unit 10 in this first exemplary embodiment comprises a first pneumatically switchable 2/2-way inlet valve 14 and a first pneumatically switchable 2/2-way outlet valve 16. The 2/2-way inlet valve 14 has a first inlet valve port 14.1, which is connected to the supply port 2. For this purpose, in this exemplary embodiment a first supply pressure line 30 runs from the supply port 2, from which a second supply pressure line 31 branches off, from which in turn a third supply pressure line 32 branches off, which is then connected to the first inlet valve port 14.1. The second inlet valve port 14.2 is connected to the first axle channel port 4, in this exemplary embodiment by means of a first braking pressure line 33. The 2/2-way inlet valve 14 is pneumatically switchable and is pressureless in a first closed switching position which is shown in FIG. 1. As soon as the first control pressure P1, which is applied to the first inlet valve control port 14.3, exceeds a certain threshold value, the first 2/2-way inlet valve 14 switches to the second switching position, which is not shown in FIG. 1, in which the first inlet valve port 14.1 is pressure-conductively connected to the second inlet valve port 14.2 and the supply pressure PV is output directly and unboosted in the first braking pressure line 33 and is output as the first braking pressure PB1 at the first axle channel port 4.

In order to vent the first axle channel port 4 and thus to release a brake, the inlet/outlet valve unit 10 has the first 2/2-way outlet valve 16. The first 2/2-way outlet valve 16 has a first outlet valve port 16.1 and a second outlet valve port 16.2, as well as a first outlet valve control port 16.3. The second outlet valve port 16.2 is connected to the first axle channel port 4. More accurately, the second outlet valve port 16.2 is connected to a first outlet line 17, which in turn branches off from the first braking pressure line 33, so that with the first 2/2-way outlet valve 16 opened the first braking pressure line 33 and thus the first axle channel port 4 can be connected to a vent 5. The first outlet valve port 16.1 is connected to the redundancy valve unit 12 in this exemplary embodiment (FIG. 1) and via this to the vent 5. The exact circuit will be described further below. The first 2/2-way outlet valve 16 is pressureless in an open first switching position shown in FIG. 1. As soon as the second control pressure P2 output at the first outlet valve control port 16.3 exceeds a certain threshold value, the first 2/2-way outlet valve 16 switches to the second switching position which is not shown in FIG. 1, in which the first outlet valve port 16.1 and the second outlet valve port 16.2 are disconnected.

In order to supply the first control pressure P1 as well as the second control pressure P2, the pilot control unit 8 has a first pilot control inlet valve 34 and a first pilot control outlet valve 36. Both the first pilot control input valve 34 and the first pilot control outlet valve 36 are designed as electrically switchable 3/2-way valves. Accordingly, the first pilot control inlet valve 34 has a first pilot control inlet valve port 34.1, a second pilot control inlet valve port 34.2 and a third pilot control inlet valve port 34.3. The first pilot control inlet valve port 34.1 is connected to the supply port 2, more precisely to a fourth supply pressure line 35, which branches off from the second supply pressure line 31. The second pilot control inlet valve port 34.2 is connected to a first control line 37, in which the first control pressure P1 can be output and which in turn is connected to the first inlet valve control port 14.3. The third pilot control inlet valve port 34.3, on the other hand, is connected to a vent 5, more precisely to a third venting line 38, which in turn is connected to a fourth venting line 39, which in turn opens in a fifth venting line 40. The fifth venting line 40 then goes to a common vent 5 for the entire electropneumatic brake control module 1.

The first pilot control inlet valve 34 is electrically switchable and receives a first switching signal S1. The first switching signal S1 is output by an electronic control unit ECU, which controls the entire electropneumatic brake control module 1. The electronic control unit ECU receives the braking demand signal SB via the electrical connection 41 and determines the first switching signal S1 based on this. The electrical connection 41 can be designed as a CAN bus connection, for example.

In a deenergized first switching position shown in FIG. 1, the second pilot control inlet valve port 34.2 is connected to the third pilot control inlet valve port 34.3, so that the first control line 37 and thus also the first inlet valve control port 14.3 are vented. With the first pilot control inlet valve 34 in the first switching position shown in FIG. 1, the first 2/2-way inlet valve 14 is therefore in the closed switching position shown.

In the second switching position of the first pilot control inlet valve 34, which is not shown in FIG. 1, the first pilot control inlet valve port is connected to the second pilot control inlet valve port, so that the supply pressure PV is output at the second pilot control inlet valve port 34.2. This is then provided as the first control pressure P1 at the first inlet valve control port 14.3, so that the first 2/2-way inlet valve 14 switches to the second switching position, which is not shown in FIG. 1.

In the same way, the first pilot control outlet valve 36 has a first pilot control outlet valve port 36.1, a second pilot control outlet valve port 36.2 and a third pilot control outlet valve control port 36.3. The first pilot control outlet valve port 36.1 is connected to the supply port 2. More accurately, the first pilot control outlet valve port 36.1 is connected to the second supply pressure line 31. The supply pressure PV is therefore applied to the first pilot control outlet valve port 36.1. The second pilot control outlet valve port 36.2 is connected to a second control line 42, which in turn is connected to the first outlet valve control port 16.3. The third pilot control outlet valve control port 36.3 is connected to the vent 5, in this exemplary embodiment via the fourth venting line 39. The first pilot control outlet valve 36, like the first pilot control inlet valve 34, is electrically switchable and receives a second switching signal S2 from the electronic control unit ECU. In the first deenergized switching position shown in FIG. 1 of the first pilot control outlet valve 36, the second pilot control outlet valve port 36.2 is connected to the third pilot control outlet valve control port 36.3, so that the second control line 42 is vented. The first 2/2-way outlet valve 16 is therefore in the first switching position shown in FIG. 1. In an energized second switching position of the first pilot control outlet valve 36, which is not shown in FIG. 1, the first pilot control outlet valve port 36.1 is connected to the second pilot control outlet valve port 36.2, so that the second control pressure P2 is output in the second control line 42. As a result, the first 2/2-way outlet valve 16 switches to the second switching position, which is not shown in FIG. 1, in which the first 2/2-way outlet valve 16 is closed.

If the pilot control unit 8 has a fault, for example because the electronic control unit ECU fails or does not function properly, the brake signal SB is not received or is not received correctly, because, for example, a central module is not working or the power supply of the vehicle has failed, both the first pilot control inlet valve 34 and the first pilot control outlet valve 36 remain in the deenergized first switching position shown in FIG. 1. Actuation of the first 2/2-way inlet valve 14 and the first 2/2-way outlet valve 16 is then no longer possible. For this purpose, the electropneumatic brake control module 1 has the redundancy pressure port 6, via which the redundancy pressure PR is received. In this case, a redundant braking pressure PBR can then be output at the first axle channel port 4 via the redundancy valve unit 12 and via the first outlet line 17, which is normally used for venting the first axle channel port 4. This means that the open first 2/2-way outlet valve 16 is used to output the redundant braking pressure PBR at the first axle channel port 4.

For this purpose, in this first exemplary embodiment (FIG. 1), the redundancy valve unit 12 has a redundancy valve 18, which is used to block the redundancy pressure PR in the normal case. The redundancy valve 18 is designed as an electrically switchable 3/2-way valve and has a first redundancy valve port 18.1, a second redundancy valve port 18.2 and a third redundancy valve port 18.3. The first redundancy valve port 18.1 is connected to the redundancy pressure port 6. The second redundancy valve port 18.2 is connected via a redundancy pressure control line 43. The third redundancy valve port 18.3 is connected to a vent or the vent 5, in this case via the fifth venting line 40. In the first deenergized switching position shown in FIG. 1, the first redundancy valve port 18.1 is connected to the second redundancy valve port 18.2. In an energized switching position, which is not shown in FIG. 1, on the other hand, the third redundancy valve port 18.3 is connected to the second redundancy valve port 18.2. Normally, when the electronic control system ECU is working, the redundancy switching signal SR can be provided and the redundancy valve 18 can be switched to the second switching position, which is not shown in FIG. 1. The redundancy pressure PR is blocked and the redundancy pressure control line 43 is vented. In the first switching position shown in FIG. 1, however, in which the redundancy valve 18 is deenergized, the redundancy pressure PR is output in the redundancy pressure control line 43.

In order to now increase the volume of this redundancy pressure PR, which is usually manually controlled via a brake pedal, the redundancy valve unit 12 has a relay valve 22 in this exemplary embodiment (FIG. 1). The relay valve 22 can be small and cost-effectively dimensioned, as it is only used for the redundancy case and therefore does not have to be designed for continuous operation.

The relay valve 22 has a relay valve supply port 22.1, a relay valve venting port 22.2, a relay valve working port 22.3 and a relay valve control port 22.4. The redundancy pressure control line 43 is connected to the relay valve control port 22.4, so that the redundancy pressure PR which is output in the event of a fault is output at the relay valve control port 22.4. The relay valve supply port 22.1 is connected to the supply port 2, so that the supply pressure PV is applied to this. The relay valve venting port 22.2 is connected to a vent or the vent 5. The relay valve working port 22.3 is connected to the first outlet valve port 16.1 in this exemplary embodiment (FIG. 1). This is realized by means of a sixth venting line 44.

In normal operation, if there is no fault, the redundancy pressure PR is blocked by providing the redundancy switching signal SR. The relay valve control port 22.4 is vented and the relay valve 22 is in a venting position, in which the relay valve working port 22.3 is also vented. This means that the first outlet line 17 can be vented via the relay valve 22 when the first 2/2-way outlet valve 16 is open. In this vented switching position, the relay valve 22 is in the normal driving mode.

Only when a fault occurs is the redundancy valve 18 switched to the deenergized state, so that the redundancy pressure PR is then output at the relay valve control port 22.4. In this case, the first 2/2-way outlet valve 16 is also in the open switching position as described above. The relay valve 22 boosts the redundancy pressure PR received at the relay valve control port 22.4 and introduces a corresponding redundant braking pressure PBR into the sixth venting line 44, via which the redundant braking pressure PBR is then provided at the first axle channel port 4 via the first 2/2-way outlet valve 16 and the first outlet line 17.

Figure 2:
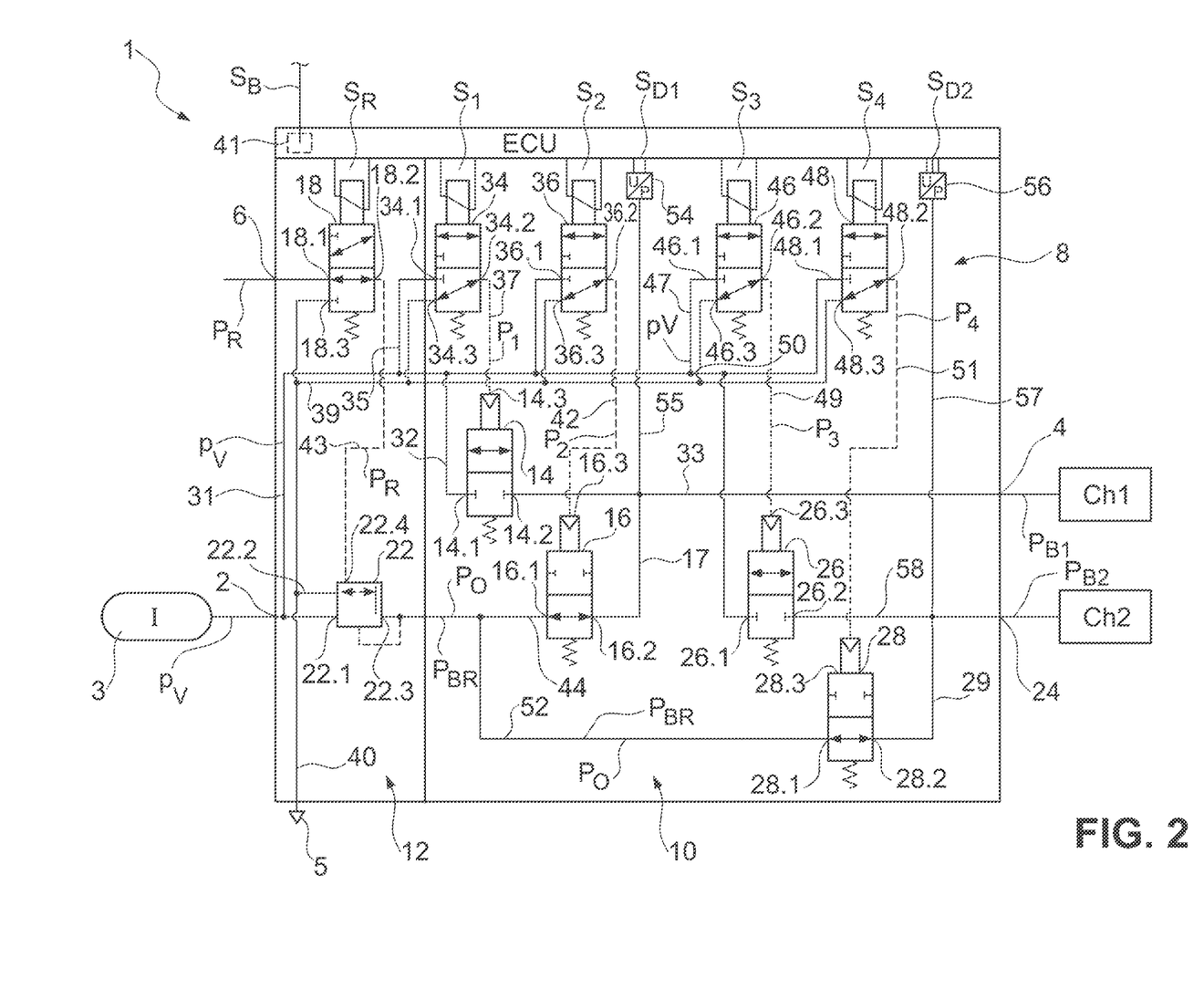
FIG. 2 shows an electropneumatic brake control module in a second exemplary embodiment with two axle channel ports.

In a second exemplary embodiment shown in FIG. 2, the essential difference from the first embodiment (FIG. 1) lies in the fact that the electropneumatic brake control module 1 has a second axle channel port 24. The second axle channel port 24 may be provided for a rear axle, for example. Alternatively, the first axle channel port 4 and the second axle channel port 24 can be used for the left and right wheels of a single axle. According to this exemplary embodiment (FIG. 2), it is possible to output a second braking pressure PB2 at the second axle channel port 24, which is independent of the first braking pressure PB1. For this purpose, both the pilot control unit 8 and the inlet/outlet valve unit 10 differ from the first exemplary embodiment. In particular, the differences are highlighted below. The redundancy valve unit 12 is of an identical design to the first exemplary embodiment (FIG. 1), and in this respect full reference is made to the above description.

In order to output the second braking pressure PB2 at the second axle channel port 24 independently of the first braking pressure PB1, the inlet/outlet valve unit 10 has a second pneumatically switchable 2/2-way inlet valve 26 for the second axle channel port 24 and a second pneumatically switchable 2/2-way outlet valve 28 for the second axle channel port 24. The second axle channel port 24 can be ventilated via the second 2/2-way outlet valve 28, and the second axle channel port 24 can be vented via the second 2/2-way outlet valve. This circuit is basically already known from the first axle channel port 4 according to FIG. 1.

For providing corresponding third and fourth control pressures P3, P4, the pilot control unit 8 has a second pilot control inlet valve 46 and a second pilot control outlet valve 48. Just like the first pilot control inlet valve 34 and the first pilot control outlet valve 36, the second pilot control inlet valve 46 and the second pilot control outlet valve 48 are also designed as electrically switchable 3/2-way valves. The second pilot control inlet valve 46 has a fourth pilot control inlet valve port 46.1, a fifth pilot control inlet valve port 46.2 and a sixth pilot control inlet valve port 46.3. The fourth pilot control inlet valve port 46.1 is connected to the supply port 2, so that the supply pressure PV is output at this. More precisely, the fourth pilot control inlet valve port 46.1 is connected to a fifth supply pressure line 47, which in turn branches off from the second pressure line in this exemplary embodiment. The fifth pilot control inlet valve port 46.2 is connected to a third control line 49, which in turn is connected to a second inlet valve control port 26.3 of the second pneumatically switchable 2/2-way inlet valve 26 in order to output the third control pressure P3 at this. The sixth pilot control inlet valve port 46.3 is connected to a vent or the vent 5, in this case via a seventh venting line 50 and the fifth venting line 40.

In a corresponding manner, the second pilot control outlet valve 48 has a fourth pilot control outlet valve port 48.1, a fifth pilot control outlet valve port 48.2 and a sixth pilot control outlet valve port 48.3. The fourth pilot control outlet valve port 48.1 is connected to the supply port 2, in this exemplary embodiment to the second supply pressure line 31, so that the supply pressure PV is applied to the fourth pilot control outlet valve port 48.1. The fifth pilot control outlet valve port 48.2 is connected to a fourth control line 51, which in turn is connected to a second outlet valve control port 28.3 of the second 2/2-way outlet valve 28 in order to provide the fourth control pressure P4 at this. The sixth pilot control outlet valve port 48.3 is connected to a vent or the vent, in this exemplary embodiment realized via the fourth venting line 39. In a first deenergized switching position shown in FIG. 2, the sixth pilot control outlet valve port 48.3 is connected to the fifth pilot control outlet valve port 48.2, so that the fourth venting line 51 and thus the second outlet valve control port 28.3 are vented. The second 2/2-way outlet valve 28 is in the first open position shown in FIG. 2. In a second energized switching position which is not shown in FIG. 2, the second pilot control outlet valve is switched so that the fourth pilot control outlet valve port 48.1 is connected to the fifth pilot control outlet valve port 48.2 and thus the fourth control pressure P4 is output. As a result of this, the second 2/2-way outlet valve 28 is switched, so that this is in the closed switching position which is not shown in FIG. 2.

In the event of a fault whereby one or more of the first to fourth switching signals S1 to S4 cannot be provided, because, for example, the pilot control unit 8 has a fault, the electronic control unit ECU has a fault or the braking demand signal SB is not provided or is not properly provided, the redundant braking pressure PR is also output at the second axle channel port 24. This is realized, as is also the case for the first axle channel port 4, via an outlet line, namely via the second outlet line 29, which is provided for venting the second axle channel port 24 by means of the second 2/2-way outlet valve 28. For this purpose, in the exemplary embodiment according to FIG. 2, the third outlet valve port 28.1 is connected to the redundancy valve unit 12 in the same way as already described above with reference to the first outlet valve port 16.1. In the exemplary embodiment shown in FIG. 2, it is realized in that an eighth venting line 52 connects the third outlet valve port 28.1 to the sixth venting line 44, so that ambient pressure P0 or the redundant braking pressure PBR is selectively output in the eighth venting line 52. If the relay valve 22 in this exemplary embodiment outputs the redundant braking pressure PBR based on the redundancy pressure PR when the redundancy valve 18 is in the first switching position shown in FIG. 2, this is output both via the sixth venting line 44 at the first outlet valve port 16.1 and via the eighth venting line 52 at the third outlet valve port 28.1 and is then provided via the first 2/2-way outlet valve 16 and the second 2/2-way outlet valve 28 at the first axle channel port 4 and the second axle channel port 24.

The third exemplary embodiment (FIG. 3) corresponds in large parts to the second exemplary embodiment (FIG. 2) but differs in the design of the redundancy valve unit 12. In the following, in particular, the differences are emphasized, wherein for the similarities reference is made to the above description of the first and the second exemplary embodiments (FIGS. 1 and 2).

Figure 3:
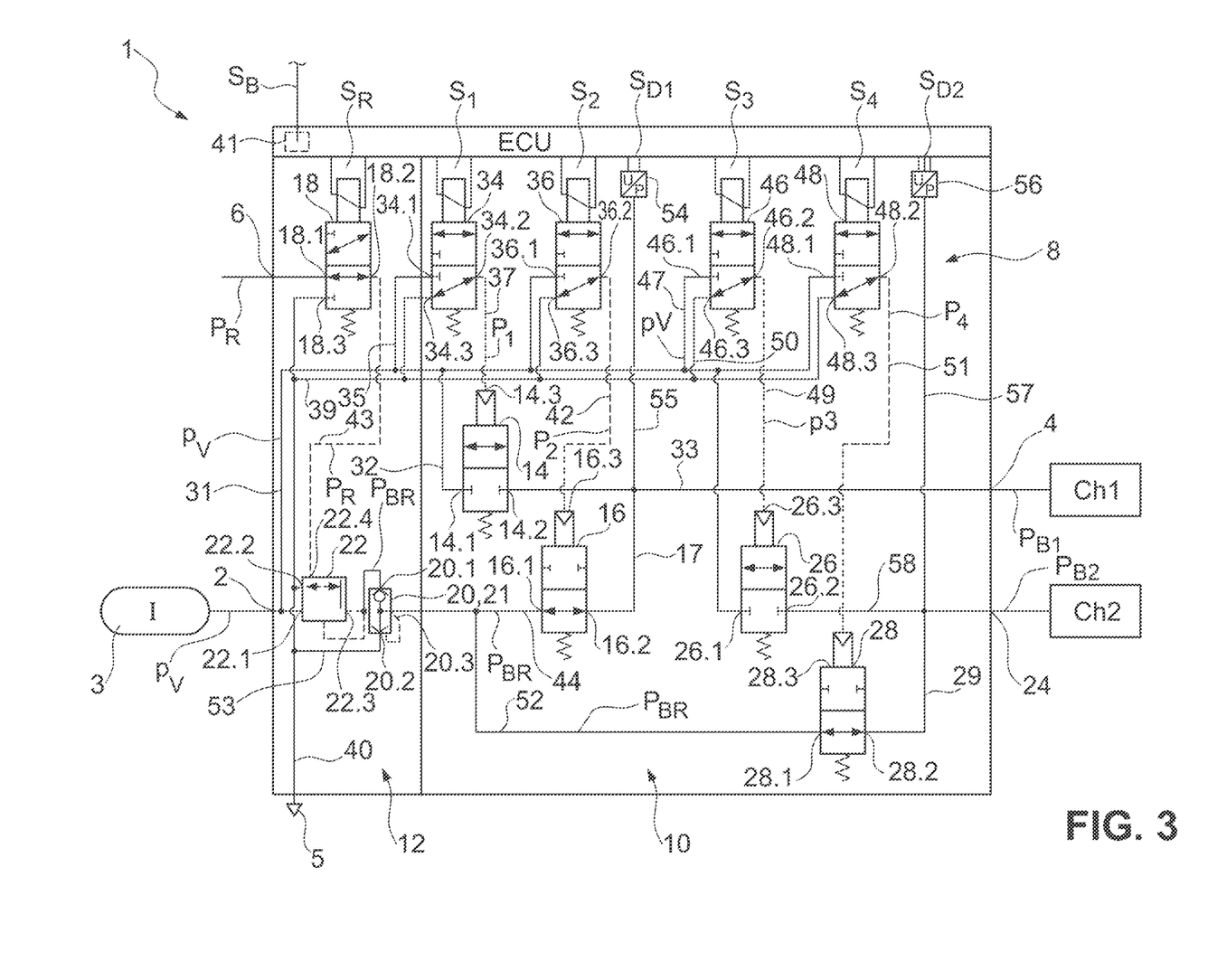
FIG. 3 shows an electropneumatic brake control module in a third exemplary embodiment with two axle channel ports and a shuttle valve.

The difference from the second exemplary embodiment (FIG. 2) is that the redundancy valve unit 12 additionally has a shuttle valve 20. The shuttle valve 20 is switched between the relay valve 12 and the first 2/2-way outlet valve 16 or the second 2/2-way outlet valve 28. This means that in this third exemplary embodiment (FIG. 3) the first and second axle channel ports 4, 24 can be vented via the shuttle valve 20, bypassing the relay valve 22; the relay valve 22 must not be used for venting the first and second axle channel ports 4, 24 in this exemplary embodiment (FIG. 3). For this purpose, the shuttle valve, which is preferably designed as a so-called select-high-valve 21, is provided with a first shuttle valve port 20.1, a second shuttle valve port 20.2 and a third shuttle valve port 20.3, wherein the third shuttle valve port 20.3 may be selectively connected to the first shuttle valve port 20.1 or the second shuttle valve port 20.2. In a rest position, the shuttle valve 20 is designed in such a way that the third shuttle valve port 20.3 is connected to the second shuttle valve port 20.2. Only when a pressure that preferably exceeds a certain threshold value is output at the first shuttle valve port 20.1, will this be passed on to the third shuttle valve port 20.3; the second shuttle valve port 20.2 is blocked in this case. In the specific exemplary embodiment shown in FIG. 3, in order to achieve this functionality, the third shuttle valve port 20.3 is connected to the sixth venting line 44, from which the eighth venting line 52 also branches off. The second shuttle valve port 20.2 is in turn connected to a ninth venting line 53, which in turn may be directly or indirectly connected to the vent 5; in this exemplary embodiment, it next opens into the fifth venting line 40. This means that in the rest state, the sixth venting line is permanently connected to the vent 5 via the shuttle valve 20, so that direct venting can take place.

The first shuttle valve port 20.1 is in turn connected to the relay valve working port 22.3, so that the redundant braking pressure PBR output by the relay valve 22 is applied to this in the redundancy case. In the event of a fault, this redundant braking pressure PBR is then transferred via the first shuttle valve port 20.1 to the third shuttle valve port 20.3 and from there is output in the sixth venting line 44 and the eighth venting line 52. Starting from these lines, the redundant braking pressure PBR is then provided at the first and second axle channel ports 4, 24 via the first 2/2-way outlet valve 16, the second 2/2-way outlet valve 28 as well as the first outlet line 17 and the second outlet line 29.

In this way, the relay valve 22 can be designed even more simply, since it is not used for venting the first and second axle channel ports 4, 24 in normal operation, but only in the event of a fault and only if the redundant braking pressure PBR is to be output at the first and second axle channel ports 4, 24.

Figure 4:
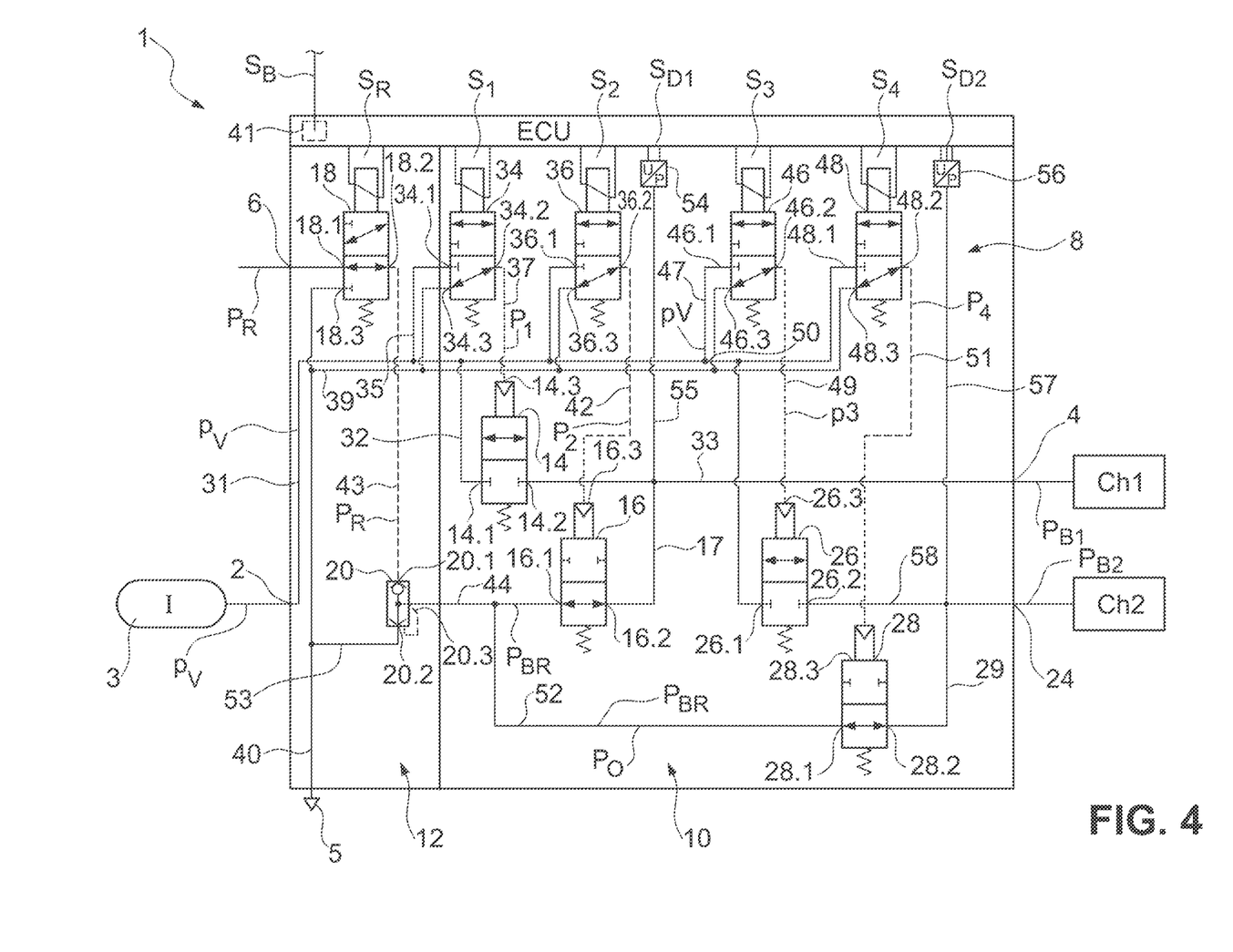
FIG. 4 shows an electropneumatic brake control module in a fourth exemplary embodiment with two axle channel ports, a shuttle valve, but without a relay valve in the redundancy valve unit.

FIG. 4 now illustrates a fourth exemplary embodiment. Again, the differences are highlighted, wherein the previous three embodiments (FIGS. 1 to 3) are referred to for the similarities.

The fourth exemplary embodiment is basically similar to the third exemplary embodiment example (FIG. 3). The difference again lies in the redundancy valve unit 12. More precisely, the difference between the fourth exemplary embodiment (FIG. 4) and the third exemplary embodiment (FIG. 3) is that no relay valve 22 is provided. Rather, the redundancy pressure control line 43 is directly connected to the first shuttle valve port 20.1, without interposing the relay valve. That is, the redundancy pressure PR is output unboosted at the shuttle valve 20.1 and accordingly is forwarded also unboosted to the third shuttle valve port 20.3 and is output unboosted as the redundant braking pressure PBR into the sixth venting line 44 and in this exemplary embodiment also into the eighth ventilation line 52 branching off therefrom. This circuit arrangement is preferred when the redundancy pressure PR already has a sufficient volume to be forwarded directly to wheel brakes or if the redundant braking pressure PBR, which in this case is then output at the first and second axle channel ports 4, 24, is volume-boosted at another module, for example at the wheel brakes themselves. In this case, the electropneumatic brake control module can be designed more simply and can be entirely without a relay valve. It would also be conceivable to increase the redundancy pressure PR volume before it is fed to the redundancy pressure port 6.

In all exemplary embodiments, pressure sensors 54, 56 are also provided. These pressure sensors 54, 56 are optional and are used to detect the first braking pressure PB1, the second braking pressure PB2 or the redundant braking pressure PBR. In this respect, a first pressure sensor 54 is connected to the first braking pressure line 33 via a first pressure measuring line 55 in order to detect the first braking pressure PB1 or, in the event of a fault, the redundant braking pressure PBR. The first pressure sensor 54 then provides a corresponding pressure signal SD1 to the electronic control unit ECU, which can process this further, for example for pressure control and depending on the provided first pressure signal SD1 can determine the first and second switching signals S1, S2. The first pressure signal SD1 can also be provided via the electrical connection 41 to a central module or the like.

In the same way, the electropneumatic brake control module 1 of the second, third and fourth exemplary embodiments also has, in addition to the first pressure sensor 54, a second pressure sensor 56, which is connected via a second pressure measuring line 57 to a second braking pressure line 58, which connects the fourth inlet valve port 26.2 to the second axle channel port 24. The second pressure sensor 56 provides a corresponding second pressure signal SD2 to the electronic control unit ECU, which can use this in turn to determine the third and fourth switching signals S3, S4 and/or to forward them to a central module.

What is claimed is:
1. An electropneumatic brake control module (1) for commercial vehicles (100), comprising:
 a supply port (2) for connecting a compressed air supply (3);
 a first axle channel port (4);
 a pneumatically controlled inlet/outlet valve unit (10) for outputting a first braking pressure (PB1) at the first axle channel port (4);

an electropneumatic pilot control unit (8) for outputting at least a first control pressure (P1) at the inlet/outlet valve unit (10);

a redundancy pressure port (6) for receiving a redundancy pressure (PR); and a redundancy valve unit (12) connected to the redundancy pressure port (6) for outputting a redundancy braking pressure (PBR) at the first axle channel port (4) in the event that the electropneumatic pilot control unit (8) has a fault;

wherein the inlet/outlet valve unit (10) has a first pneumatically switchable 2/2-way inlet valve (14) and a first pneumatically switchable 2/2-way outlet valve (16), wherein the first pneumatically switchable 2/2-way inlet valve (14) receives the first control pressure (P1) and the first pneumatically switchable 2/2-way outlet valve (16) receives a second control pressure (P2) from the pilot control unit (8).

2. The electropneumatic brake control module (1) as claimed in claim 1, wherein the first braking pressure (PB1) from the inlet/outlet valve unit (10) is directly fed from the supply port (2) to the first axle channel port (4) without boosting.

3. The electropneumatic brake control module (1) as claimed in claim 1, wherein the redundancy valve unit (12) is connected to the inlet/outlet valve unit (10) for enabling an output of the redundant braking pressure (PBR) via a first outlet line (17) for venting the first axle channel port (4) at the first axle channel port (4) in the event of a pilot control unit (8) fault.

4. The electropneumatic brake control module (1) as claimed in claim 3, wherein the redundancy valve unit (12) has a shuttle valve (20) and the redundancy braking pressure (PBR) can be introduced into the first outlet line (17) via the shuttle valve (20).

5. The electropneumatic brake control module (1) as claimed in claim 4, wherein the shuttle valve (20) has a first shuttle valve port (20.1) connected or connectable to the redundancy pressure port (6), a second shuttle valve port (20.2) connected to a vent (5) and a third shuttle valve port (20.3) connected or connectable to the first outlet line (17) and selectively connects the third shuttle valve port (20.3) to either the first shuttle valve port (20.1) or the second shuttle valve port (20.2).

6. The electropneumatic brake control module (1) as claimed in claim 5, wherein the first shuttle valve port (20.1) is connected to a second redundancy valve port (18.2).

7. The electropneumatic brake control module (1) as claimed in claim 5, wherein the first shuttle valve port (20.1) is connected to a relay valve working port (22.3).

8. The electropneumatic brake control module (1) as claimed in claim 3, wherein the redundancy valve unit (12) has a relay valve (22) for volume boosting of the redundancy pressure (PR).

9. The electropneumatic brake control module (1) as claimed in claim 8, wherein the relay valve (22) has a relay valve supply port (22.1) connected to the supply port (2), a relay valve venting port (22.2) connected to a vent (5), a relay valve working port (22.3) for outputting the redundant braking pressure (PBR) into the first outlet line (17), and a relay valve control port (22.4) connected or connectable to the redundancy pressure port (6).

10. The electropneumatic brake control module (1) as claimed in claim 9, wherein the relay valve working port (22.3) is connected to a first outlet valve port (16.1).

11. The electropneumatic brake control module (1) as claimed in claim 9, wherein the relay valve control port (22.4) is connected to a second redundancy valve port (18.2).

12. The electropneumatic brake control module (1) as claimed in claim 1, wherein:

the first pneumatically switchable 2/2-way inlet valve (14) has a first inlet valve port (14.1) connected to the supply port (2), a second inlet valve port (14.2) connected to the first axle channel port (4) and a first inlet valve control port (14.3) for receiving the first control pressure (P1); and the first pneumatically switchable 2/2-way outlet valve (16) has a first outlet valve port (16.1) connected or connectable to a vent (3), a second outlet valve port (16.2) connected to the first axle channel port (4) and a first outlet valve control port (16.3) for receiving the second control pressure (P2).

13. An electropneumatic brake control module (1) for commercial vehicles (100), comprising:

a supply port (2) for connecting a compressed air supply (3);

a first axle channel port (4);

a pneumatically controlled inlet/outlet valve unit (10) for outputting a first braking pressure (PB1) at the first axle channel port (4);

an electropneumatic pilot control unit (8) for outputting at least a first control pressure (P1) at the inlet/outlet valve unit (10);

a redundancy pressure port (6) for receiving a redundancy pressure (PR); and a redundancy valve unit (12) connected to the redundancy pressure port (6) for outputting a redundancy braking pressure (PBR) at the first axle channel port (4) in the event that the electropneumatic pilot control unit (8) has a fault;

wherein the redundancy valve unit (12) has a redundancy valve (18), with a first redundancy valve port (18.1) connected to the redundancy pressure port (6), a second redundancy valve port (18.2) connected to the first axle channel port (4) and a third redundancy valve port (18.3) connected to a vent (5).

14. An electropneumatic brake control module (1) for commercial vehicles (100), comprising:

a supply port (2) for connecting a compressed air supply (3);

a first axle channel port (4);

a pneumatically controlled inlet/outlet valve unit (10) for outputting a first braking pressure (PB1) at the first axle channel port (4);

an electropneumatic pilot control unit (8) for outputting at least a first control pressure (P1) at the inlet/outlet valve unit (10);

a redundancy pressure port (6) for receiving a redundancy pressure (PR);

a redundancy valve unit (12) connected to the redundancy pressure port (6) for outputting a redundancy braking pressure (PBR) at the first axle channel port (4) in the event that the electropneumatic pilot control unit (8) has a fault; and a second axle channel port (24);

wherein the inlet/outlet valve unit (10) is configured to output a second braking pressure (PB2) at the second axle channel port (24);

wherein the electropneumatic pilot control unit (8) is configured for at least a third control pressure (P3) at the inlet/outlet valve unit (10), and wherein the redundancy valve unit (12) is configured to output the redundant braking pressure (PBR) at the second axle channel port (24) in the event that the electropneumatic pilot control unit (8) has a fault.

15. The electropneumatic brake control module (1) as claimed in claim 14, wherein the redundancy valve unit (12) is connected to the inlet/outlet valve unit (10) for enabling an output of the redundant braking pressure (PBR) to the second axle channel port (24) via a second outlet line (29) for venting the second axle channel port (24) in the event of a control unit (8) fault.

16. The electropneumatic brake control module (1) claim 14, wherein the inlet/outlet valve unit (10) has a second pneumatically switchable 2/2-way inlet valve (26) and a second pneumatically switchable 2/2-way outlet valve (28) for the second axle channel port (24), wherein the second pneumatically switchable 2/2-way inlet valve (26) receives the third control pressure (P3) and the second pneumatically switchable 2/2-way outlet valve (28) receives a fourth control pressure (P4) from the pilot control unit (8).

17. The electropneumatic brake control module (1) as claimed in claim 14, wherein:
the second pneumatically switchable 2/2-way inlet valve (26) has a third inlet valve port (26.1) connected to the supply port (2), a fourth inlet valve port (26.2) connected to the second axle channel port (24) and a second inlet valve control port (26.3) for receiving the third control pressure (P3); and
the second pneumatically switchable 2/2-way outlet valve (28) has a third outlet valve port (28.1) connected or connectable to a vent (3), a fourth outlet valve port (28.2) connected to the first axle channel port (24) and a second outlet valve control port (28.3) for receiving the fourth control pressure (P4).

18. The electropneumatic brake control module (1) as claimed in claim 17, further comprising a relay valve working port (22.3) connected to a third outlet valve port (28.1).

19. The electropneumatic brake control module (1) as claimed in claim 14, further comprising a second redundancy valve port (18.2) configured to be connected to the second axle channel port (24).

20. The electropneumatic brake control module (1) as claimed in claim 14, further comprising a shuttle valve (20) configured to introduce the redundant braking pressure (PBR) into the second outlet line (19).

21. The electropneumatic brake control module (1) as claimed in claim 14, further comprising a relay valve working port (22.3) configured for outputting the redundant braking pressure (PBR) into the second outlet line (19).

* * * * *